(12) United States Patent
Berneth et al.

(10) Patent No.: US 7,190,506 B1
(45) Date of Patent: Mar. 13, 2007

(54) ELECTROCHROMIC DEVICE WITH NANOPARTICLES AND UV-ABSORBERS IN THE PROTECTIVE COATING

(75) Inventors: Horst Berneth, Leverkusen (DE); Werner Hoheisel, Köln (DE); Ralf Neigl, Yorktown Heights, NY (US); Hermann Womelsdorf, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/913,133

(22) PCT Filed: Feb. 1, 2000

(86) PCT No.: PCT/EP00/00782

§ 371 (c)(1),
(2), (4) Date: Aug. 9, 2001

(87) PCT Pub. No.: WO00/48040

PCT Pub. Date: Aug. 17, 2000

(30) Foreign Application Priority Data

Feb. 12, 1999 (DE) ............................... 199 05 797

(51) Int. Cl.
*G02F 1/153* (2006.01)
*G02B 5/23* (2006.01)

(52) U.S. Cl. ................ 359/274; 359/265; 359/267; 359/275; 252/586; 252/600

(58) Field of Classification Search ........ 359/265–275; 252/583, 586, 600
See application file for complete search history.

(56) References Cited

U.S. PATENT DOCUMENTS

| | | | |
|---|---|---|---|
| 3,280,701 A | 10/1966 | Donnelly et al. ............ 359/267 |
| 4,902,108 A | 2/1990 | Byker ......................... 350/357 |
| 5,073,012 A | 12/1991 | Lynam ........................ 359/265 |
| 5,115,346 A * | 5/1992 | Lynam ........................ 359/265 |
| 5,128,267 A | 7/1992 | Köcher et al. ................ 436/92 |
| 5,140,455 A | 8/1992 | Varaprasad et al. ......... 359/275 |
| 5,151,816 A | 9/1992 | Varaprasad et al. ......... 359/275 |
| 5,280,380 A * | 1/1994 | Byker ......................... 359/265 |
| 5,300,637 A | 4/1994 | Hatch et al. ................. 548/162 |
| 5,322,680 A | 6/1994 | Beck et al. .................... 436/73 |
| 5,472,477 A | 12/1995 | König .......................... 75/343 |
| 5,553,630 A | 9/1996 | Dupuis et al. ............... 132/202 |
| 5,604,626 A | 2/1997 | Teowee et al. .............. 359/265 |
| 5,838,483 A | 11/1998 | Teowee et al. .............. 359/265 |
| 5,859,722 A * | 1/1999 | Suga et al. .................. 359/265 |
| 6,207,292 B1 | 3/2001 | Berneth et al. .............. 428/583 |
| 6,466,355 B1 * | 10/2002 | Berneth et al. .............. 359/265 |
| 2002/0027700 A1 * | 3/2002 | Berneth et al. .............. 359/265 |
| 2003/0103256 A1 * | 6/2003 | Berneth et al. .............. 359/265 |

FOREIGN PATENT DOCUMENTS

| | | |
|---|---|---|
| DE | 3917323 | 11/1990 |
| DE | 4435211 | 4/1995 |
| EP | 628303 | 12/1994 |
| EP | 0 752 612 A1 * | 8/1997 |
| EP | WO 98/05736 * | 2/1998 ............ 359/265 |
| WO | 93/06164 | 4/1993 |
| WO | 95/09895 | 4/1995 |
| WO | 97/45767 | 12/1997 |
| WO | 99/32574 | 7/1999 |

OTHER PUBLICATIONS

D. Theis, Ullmann's Encyclopaedia of Industrial Chemistry, vol. A8, pp. 621-623, month unavailable 1987, "Electromechanical Displays".
Elektrokhimiya, pp. 24-28 (Translated from Elektrokhimiya, vol. 13, No. 1, pp. 32-37 Jan. 1977, Shelepin et al, "Electrochromism of Organic Compounds i. Electrochemical and Spectral Properties of a System Based on Methylviologen and 3-Ethyl-2-Benzothiazolone Azine".
Elektrokhimiya, date unavailable pp. 404-408, (Translated from Elektrokhimiya, vol. 13, No. 4, pp. 474-478, Apr. 1977) O.S. Abramzon et al, "Moisture-Exchange Process in Hydrogen-Oxygen Cells with Capillary Membrane iii. Nonstationary Processes During Load Connection".
Electrohimiya, pp. 271,274 (Translated from Elektrokhimiya, vol. 14, No. 2, pp. 319-322, Feb. 1978. Orgiginal article submitted Nov. 4, 1976) O.A. Ushakov et al, "Electrochromism of Organic Compounds Some Properties of Two-Electrode Cells".
Absorption and Scattering by A Sphere, pp. 93-104, month unavailable, 1983, "The Internal And Scattered Fields".
J. Phys. Chem, month unavailable 1993, 97, pp. 1223-1230, K.A. Littau et al, "A Luminescent Silicon Nanocrystal Colloid via a High-Temperature Aerosol Reaction".
J. Vac. Sci. Tehcnol. A 10(4), Jul./Aug. 1993, pp. 1048-1052, J.L. Doier et al, "Powder Dynamics in Very High Frequency Silane Plasmas".
Int. J. Heat Mass Transfer, vol. 31, No. 11, month unavailable, 1988, pp. 2239-2249, I.S. Akmandor et al, "Heat and Momentum Transfer in Laser Induced Decomposition of Silane Jets: Theory and Experiments".
NanoStructured Materials, vol. 6, month unavailable, 1995, pp. 493-496, J. Dutta et al, Crystallization of Amorphous Nono-sized Silicon Powders.
Topics in Current Chemistry, vol. 92, month unavailable, 1980, pp. 1-44, S. Hünig et al, "Two Step Reversible Redox Systems of the Weitz Type".

(Continued)

Primary Examiner—Evelyn A. Lester
(74) Attorney, Agent, or Firm—Morris McLaughlin & Marcus, PA

(57) ABSTRACT

An electrochromic device which carries a coating comprising at least one UV absorber and nanoparticles is effectively protected against destruction by UV light.

14 Claims, No Drawings

OTHER PUBLICATIONS

Angew. Chem., 90, month unavailable, 1997, pp. 927-938, V.K. Deuchert et al "Mehrstufige Organische Redoxsysteme-ein Allgemeines Strukturprinzip".

Adv. Mater., 3, month unavailable, 1991, No. 5, pp. 225-236, S. Hünig et al, "DCNQls-New Electron Acceptors For Charge-Transfer Complexes and Highly Conducting Radical Anion Salts".

J. Am. Chem. Soc. month unavailable, 1995, 117, pp. 8528-8535, G.V. Tormos et al, Dithiadiazafulvanlences-New Strong Electron Donors. Sythesis, Isolation, Properties, and EPR Studies.

J. Chem. Soc. Perkin Trans., 2, month unavailable, 1990, pp. 1777-1783, M.R. Bryce et al, Synthesis and Redox Behaviour of Highly conjugated Bis(benzo-1,3-dithiole) and Bis(benzothiazole) Systems Containing Aromatic Linking Groups: Model Systems for Organic Methals[1].

J. Org. Chem., month unavailable 1992, 57 pp. 1849-1855, G.A. Crispino et al, "Synthesis of Tripyridiniumylpropehyl Anions From Tripyridiniumylcyclopropanes and -cyclopropens[1]".

J. Am. Chem. Soc., Aug. 31, 1977, 99:18, pp. 6120-6122, R.J. Bose et al "Bicyclo[1.1.0] Butanes. A New Synthetic Route and Valence Isomerizations".

Int. J. Heat Mass Transfer, vol. 32, No. 11, month unavailable 1988, pp. 2227-2238, T. Skiepko et al, "The effect of Matrix Longitudinal Heat Conduction on the Temperature Fields in the Rotary Heat Exchanger".

Absorption & Scattering of Light by Small Particle month unavailable 1983, pp. 130-141, "particles Small compared with the Wavelength".

* cited by examiner

ELECTROCHROMIC DEVICE WITH NANOPARTICLES AND UV-ABSORBERS IN THE PROTECTIVE COATING

The present invention relates to a UV-protected electrochromic device.

Electrochromic devices are already known, for example from D. Theis in Ullmann's Encyclopedia of Industrial Chemistry, Vol. A 8, p. 622, Verlag Chemie 1987 and WO-A 94/23333. A distinction is made between two basic types:

Type 1: full-area electrochromic devices;

Type 2: electrochromic display devices having structured electrodes.

Type 1 is used, for example, in electrically darkenable window panes or electrically dimmable automobile mirrors. Such devices are disclosed, for example, in U.S. Pat. No. 4,902,108.

Type 2 is used in segment and matrix displays. Such display devices are proposed, for example, in German Patent Application P 196 31 728. Devices of this type can be observed transmissively or, in the case of reflection, reflectively.

WO-A 94/23333 compares electrochromic materials having different constructions, but these are not used as display devices:

Construction a: the electrochromic substances are in the form of a fixed film or layer on the electrodes (cf. Ullmann, see above).

Construction b: the electrochromic substances are deposited on the electrodes as a film by the redox process (cf. Ullmann, see above).

Construction c: the electrochromic substances remain permanently in solution.

For construction a), the best-known electrochromic material is the tungsten oxide/palladium hydride pair.

For construction b), viologens have been described as electrochromic substances. These devices are not self-erasing, i.e. the image produced remains after the current has been switched off and can only be erased again by reversing the voltage. Such devices are not particularly stable and do not allow a large number of switching cycles.

In addition, the cells constructed using tungsten oxide/palladium hydride in particular cannot be operated in transmitted light, but only reflectively, owing to light scattering at these electrochromic layers.

Elektrokhimiya 13, 32–37 (1977), 13, 404–408, 14, 319–322 (1978), U.S. Pat. No. 4,902,108 and U.S. Pat. No. 5,140,455 disclose an electrochromic system of the latter construction c). An electrochromic cell built up from glass plates with a conductive coating contains a solution of a pair of electrochromic substances in an inert solvent.

The pair of electrochromic substances used is one electrochemically reversibly reducible substance and one reversibly oxidizable substance. Both substances are colorless or only weakly colored in the ground state. Under the action of an electric voltage, one substance is reduced and the other oxidized, both becoming colored. When the voltage is switched off, the ground state re-forms in the case of both substances, accompanied by decolorization or a color lightening.

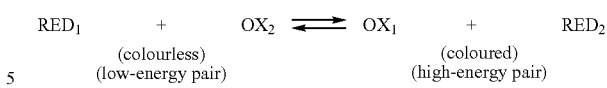

$$RED_1 + OX_2 \rightleftarrows OX_1 + RED_2$$
(colourless) (coloured)
(low-energy pair) (high-energy pair)

U.S. Pat. No. 4,902,108 discloses that suitable pairs of redox substances are those in which the reducible substance has at least two chemically reversible reduction waves in the cyclic voltammogram and the oxidizable substance correspondingly has at least two chemically reversible oxidation waves.

Various applications have been described for such electrochromic cells of construction c. For example, they can be formed as automobile rear-view mirrors which can be darkened during night driving by application of a voltage and thus prevent dazzling by the headlamps of following vehicles (cf., for example, U.S. Pat. No. 3,280,701, U.S. Pat. No. 4,902,108 and EP-A 0 435 689). Furthermore, such cells can also be employed in window panes or automobile sunroofs, where they darken the sunlight after application of a voltage. Likewise described is the use of such devices as electrochromic display devices, for example in segment or matrix displays having structured electrodes (German Patent Application P 196 31 728).

The electrochromic cells normally consist of a pair of glass plates, of which, in the case of the automobile mirror, one is mirrored. One side of these plates is coated over the full area with a light-transparent, electroconductive layer, for example indium-tin oxide (ITO), where, in the case of display devices, this conductive coating is divided into electrically separated segments provided with individual contacts. These plates are used to construct a cell by bonding them by means of a sealing ring with their electroconductively coated sides facing one another to form a cell. This cell is filled with an electrochromic liquid via an opening, and the cell is tightly sealed. The two plates are connected to a voltage source via the ITO layers.

The electrochromic compounds described above generally exhibit sensitivity to light, in particular UV light. Electrochromic devices which contain UV absorbers have therefore been described, for example in U.S. Pat. No. 5,280,380. Electrochromic automobile mirrors which contain such absorbers in a scatterproof coating have also been described (U.S. Pat. No. 5,073,012).

The UV light absorbers used hitherto are usually organic compounds which have a molecular absorption band in the relevant wavelength range and do not absorb in the visible spectral region. These compounds have the disadvantage that they have to be dissolved, in some cases in high concentrations, in the electrochromic solution or in the polymer layer which is applied to one of the two plates. However, the solubility in these media is frequently limited, and consequently so is the effectiveness of the UV absorber. Furthermore, they may fade on exposure to light and/or evaporate out or be washed out of the polymeric substrate.

It is also known that inorganic solid materials are able to absorb UV light.

These inorganic particles can absorb and/or scatter regions of the harmful UV light, depending on their size and the choice of material. Absorption is preferred to scattering of light, since, in particular in the case of incorporation of the particles into the material to be protected, scattered photons may furthermore damage the latter. Furthermore, an excessive scattered component of the light results in haze formation in the material to be protected. Absorption and Scattering of Light by Small Particles, C. F. Bohren, D. R. Huffman, pp. 93 to 104 and 130 to 141, 1983, discloses that, with decreasing size of the particles, their absorption capacity for light is greater than their ability to scatter light. For a transparent UV light absorber, only very small particles are thus suitable. In order also to ensure that the UV light absorber is colorless, the material of the particles must have an absorption edge in the wavelength range from about 300 nm to 400 nm. As claimed in WO-A 93/06164, materials having a band gap between 2.8 eV and 4.1 eV, which corresponds to a wavelength range between 303 nm and 445 nm, are suitable for an action of this type. For this application, $TiO_2$, ZnO, $CeO_2$ and SiC, inter alia, are already being employed from this class of materials, see, for example, WO-A 93/06164, WO-A 95/09895 and WO-A 92/21315.

Nanoparticles of this type, in particular those which are to be produced in simple industrial processes, have the disadvantage that their absorption edge cannot be set as desired. Consequently, it is not readily possible to provide nanoparticles which are optimally matched to the absorption behaviour of the electrochromic substances.

Consequently, the object was to provide UV protection for electrochromic cells which does not have the disadvantages known from the prior art.

It has now been found that the electrochromic devices described above can be effectively protected against destruction by UV light by a combination of inorganic nanoparticles with organic UV absorbers.

The invention accordingly relates to an electrochromic device which carries a coating comprising at least one UV absorber and nanoparticles.

Coatings of this type offer UV protection which can be matched optimally to the properties of the electrochromic substances. The combination results in a strengthening of the UV protection and in an improvement in its light stability.

The invention accordingly relates to an electrochromic device consisting of a pair of glass or plastic plates or plastic films of which at least one plate or film, preferably both plates or films, are provided on in each case one side with an electrically conductive coating, of which at least one plate or film and its conductive coating is transparent, of which the other may be mirrored, and of which in the case of at least one of the two plates or films the electrically conductive layer can be divided into separate, individually contacted area segments, where the plates or films are joined together via a sealing ring on the sides of their conductive coating, and the volume formed by the two plates or films and the sealing ring is filled with an electrochromic medium, characterized in that at least one of the two plates or films carries a coating which comprises at least one UV absorber and nanoparticles.

In a particular embodiment, the UV absorber is an organic UV absorber. In a particular embodiment, the nanoparticles are inorganic nanoparticles.

Particular preference is given as claimed in the invention to electrochromic devices in which at least one of the two conductive layers is coated with an electrochromic layer, and to electrochromic devices in which the electrochromic medium is an electrochromic solution, characterized in that the electrochromic device carries a coating which comprises at least one UV absorber and nanoparticles.

Suitable nanoparticles are those based on SiC, AlSi, Ag, $Fe_2O_3$, $Fe_3O_4$, $TiO_2$, ZnO, GaP, $CeO_2$, ZnS, $SnO_2$, $Si_yGe_{1-y}$, $W_xMo_{1-x}O_3$, NiO, $Bi_2O_3$, $In_2O_3$, $HfO_2$, $BaTiO_3$, $CaTiO_3$, Ge, AlP, GaN, in which $0.7 \leq y < 1$ and $0 \leq x \leq 1$.

Particularly suitable nanoparticles for the purposes of the invention are the materials based on Ag, $TiO_2$, ZnO, $CeO_2$, SiC, AlSi, $Fe_2O_3$, $Fe_3O_4$, $W_xMo_{1-x}O_3$, $BaTiO_3$, $CaTiO_3$, or mixtures thereof, which are known from the above-mentioned literature and the patent applications.

Haze formation by the UV absorber particles is unacceptable for an electrochromic device, since high light transmission and in particular sharp imaging is required in the various areas of application mentioned, such as automobile mirrors or display devices. Particles which form free radicals are particularly unusable if these particles are in the electrochromic solution. An interaction with $OX_1$ and $RED_2$, which are generally in the form of free radicals or free radical ions and have been formed by electrode reaction, would engage in the above-mentioned equilibrium and result in undesired color changes and/or inadequate color extinction after the voltage has been switched off. Particular preference is given to nanoparticles having a mean diameter of less than 500 nm, preferably less than 100 nm, particularly preferably less than 50 nm, very particularly preferably less than 20 nm.

Particular preference is given to silver nanoparticles. They exhibit an absorption maximum which is shifted through the choice of the ambient medium and its refractive index E. For example, the maximum is at 395 nm when $\epsilon=1.33$, at 408 nm when $\epsilon=1.45$, and at 422 µm when $\epsilon=1.55$. The absorption behaviour can thus be matched to the respective conditions through the choice of the coating of the electrochromic device.

Particular preference is likewise given to nanoparticles which comprise predominantly particles of silicon and/or solid compounds in which silicon is present in a stoichiometric excess. A mean diameter of less than 120 µm is advantageous. They have advantageous properties, such as high transparency in the visible spectral region at low particle concentrations, high stability in air, high environmental and biocompatibility and complete absence of photocatalytic activities, and filter out light in the UVA and UVB region with high efficiency.

The term "mean diameter" is taken to mean the maximum of the number distribution.

Elemental silicon is amorphous or crystalline silicon, preferably crystalline silicon. The size of the silicon particles is preferably from 1 nm to 120 nm, particularly preferably from 1 nm to 70 nm, very particularly preferably from 10 nm to 50 nm. These particles preferably have a size distribution with a maximum half-value width of 40 nm. Silicon particles having this mean diameter are preferably produced by a gas-phase reaction (CVR) by the process described in U.S. Pat. No. 5,472,477. Production is likewise possible in accordance with J. Phys. Chem., 97, pp. 1224 to 1230 (1973), J. Vac. Sci. Technol. A10, p. 1048 (1992) and Int. J. Heat Mass Transfer 31, p. 2236 (1988).

The term "solid compounds" covers compounds which are solid at room temperature, such as, for example, silicides, $CaSi_2$ and/or $BaSi_2$. The term "compounds in which silicon is present in stoichiometric excess" preferably covers compounds of the formula $Si_xZ_{1-x}$ where $0.5 < x \leq 1$, preferably $0.7 < x \leq 1$, and Z=C, N, O, Ge, Ca, Ba or Sr. The presence of other materials shifts the energetic position of the absorption edge in certain limits and modifies the shape of the edge. Preferred solid compounds here are $Si_xC_{1-x}$ and $Si_xGe_{1-x}$.

Preference is given to nanoparticles comprising all materials described hitherto which are spherical or virtually spherical. The term "virtually spherical" is taken to mean, for example, ellipsoids having an axis ratio of 1:4, preferably 1:2.

Preference is likewise given to nanoparticles comprising all materials described hitherto which have a core/shell structure. The shell may have been organically modified.

The shell consists, for example, of an oxide of the material of the nanoparticle. However, it can also consist of another material which is transparent in the visible region and whose refractive index is similar to that of the nanoparticle. The thickness of an oxide layer can be, for example, from 1 to 300 nm.

In a preferred embodiment of invention, the nanoparticles have a core/shell structure, for example in the case of solid compounds in which silicon is present in stoichiometric excess. It is preferred here for this to consist of a core of titanium nitride and its shell of silicon, where the silicon volume proportion is at least 30% per particle.

The mean diameter of the particles of all types described hitherto is preferably less than 120 mm, particularly preferably less than 100 µm, very particularly preferably less than 50 nm. These preferably have a particle size distribution with a maximum half-value width of 40 nm, preferably 30 µm, particularly preferably 20 nm.

The preparation of the solid compounds, including those having a core/shell structure, can be carried out, for example, by thermal decomposition of a silicon-containing gas, such as, for example, silanes, organosilanes or $SiCl_4$, giving an aerosol (see J. Phys. Chem., 97, pp. 1224 to 1230 (1973), J. Vac. Sci. Technol. A10, p. 1048 (1992)). Admixture of further gases containing, for example, germanium or carbon results in compounds with a corresponding stoichiometric composition. In the case of solid compounds having a core/shell structure, the core is produced first by means of the processes described above, and the shell is subsequently applied by decomposition or reaction in the gas phase of gases with a corresponding composition, such as, for example, $SiH_4$ or $SiCl_4$ together with $H_2$. The thermal decomposition can be carried out in a gas-phase reactor, preferably in a CVR (chemical vapour reaction) reactor, or alternatively by laser absorption (see Int. J. Heat Mass Transfer, 31, p. 2239 (1988)). The thermal decomposition of gases is particularly suitable for the production of crystalline particles. Production is likewise possible via a PECVD (plasma enhanced chemical vapour deposition) process (see J. Vac. Sci. Technol., A10, p. 1048 (1992)). In the latter process, amorphous particles are formed which can be crystallized by thermal aftertreatment (see Nanostructured Materials, Vol. 6, pp. 493 to 496 (1995)).

The nanoparticles can also be in the form of agglomerates. In the case of silicon, the optical properties of the agglomerates differ from those of the primary particles, since the electromagnetic interaction of the particles with one another results in the formation of new absorption channels, which are in some cases also in the visible spectral region.

The primary particles of the nanoparticles may also be surrounded by an oxide layer. This prevents direct contact of the primary particles and thus their agglomeration. The thickness of the oxide layer is preferably from 1 nm to 300 nm, particularly preferably from 10 to 100 nm. Advantageous oxide layers are those whose refractive index in the visible spectral region has very similar values to that of the media to be protected against UV radiation, such as, for example: polycarbonate, polyurethane and organic solutions, such as the electrochromic medium. The light-scattering action is thus reduced and the matrix remains transparent. This oxide layer can be produced, for example, by metering oxygen into the CVR reactor after production of the particles.

In a preferred embodiment, the term "nanoparticles" is taken to mean a mixture which additionally contains particles, for example of oxides and/or nitrides of metals which absorb to a greater extent in the red spectral region from 600 nm<λ<700 nm than in the blue-green spectral region from 400 nm<λ<550 nm. Preferred additives of this type are particles of titanium nitride having a mean diameter of from 1 nm to 400 nm, preferably from 10 nm to 120 nm, or agglomerates of these titanium nitride primary particles. They can be produced, for example, in accordance with U.S. Pat. No. 5,472,477. In a preferred embodiment, the UV light absorber, besides silicon particles, also contains TiN particles having a mean diameter of from 10 to 120 nm. This mixture has a very effective action in the UVA range and at the same time ensures color neutrality with high transparency. Preference is likewise given to additives in the form of particles of aluminium sodium silicates (ultramarine pigments), for example obtainable from Nubiola S. A., under the name Nubix® pigments. They may furthermore contain iron(III) hexacyanoferrate(II) as additives.

In a further embodiment of the invention, the nanoparticles employed are preferably a mixture of the silicon-containing particles and particles from the following group: silicon carbide and/or oxides of the metals titanium, cerium, tungsten, zinc, tin and iron. Mixtures of this type enable the absorption edge, in particular its steepness, to be manipulated. The particle size of the admixed particles is preferably from 1 m to 200 nm. These too are obtainable, inter alia, by the process described in U.S. Pat. No. 5,472,477.

Organic UV absorbers which can be employed are, for example, those based on substituted benzophenones or cinnamic acid esters, as known, for example, from U.S. Pat. No. 5,280,380 and U.S. Pat. No. 5,073,012.

Preference is given to organic UV absorbers selected from the formulae

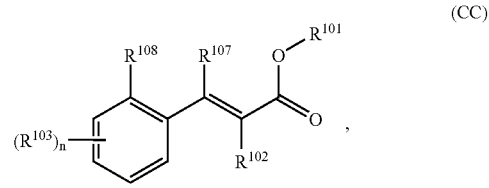
(CC)

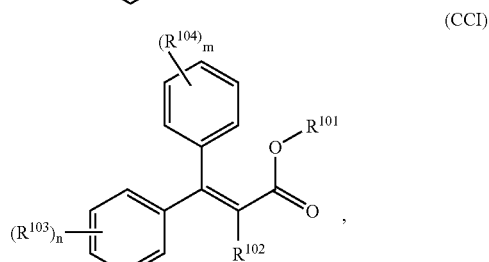
(CCI)

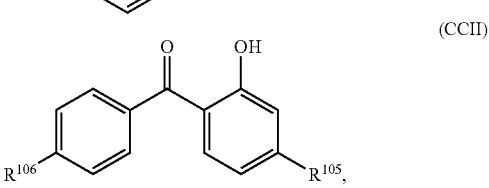
(CCII)

in which $R^{101}$ is optionally substituted $C_1$- to $C_{20}$-alkyl, $R^{102}$ is hydrogen, cyano or $COOR^1$, $R^{103}$, $R^{104}$ and $R^{106}$, independently of one another, are hydrogen, $C_1$- to $C_{12}$, or $C_1$- to $C_{12}$-alkoxy, $R^{105}$ is hydrogen, $C_1$- to $C_{12}$-alkyl, $C_1$- to $C_{12}$-alkoxy or hydroxyl, $R^{107}$ is hydrogen or $C_1$- to $C_{12}$-alkyl, $R^{108}$ is hydrogen, or $R^{107}$, together with $R^{108}$, forms a $C_2$- or $C_3$-bridge, which may carry up to 3 $C_1$- to $C_4$-alkyl radicals, and n and m, independently of one another, are an integer from 1 to 3.

Preference is given to UV absorbers selected from the formulae (CC), (CCI) and (CCII)

in which $R^{101}$ is optionally substituted $C_1$- to $C_{20}$-alkyl, $R^{102}$ is hydrogen or cyano, $R^{103}$, $R^{104}$ and $R^{106}$, independently of one another, are hydrogen or $C_1$- to $C_{12}$-alkoxy, $R^{105}$ is $C_1$, to $C_{12}$-alkoxy or hydroxyl, $R^{107}$ and $R^{108}$ are hydrogen, or $R^{107}$, together with $R^{108}$, is —(CH$_2$)$_2$—, —(CH$_2$)$_3$— or —CH$_2$—C(CH$_3$)$_2$—, and n and m, independently of one another, are 1 or 2.

Particular preference is given to UV absorbers selected from the formulae (CC), (CCI) and (CCII)

in which $R^{101}$ is methyl, ethyl, 1- or 2-propyl, 1- or 2-butyl, 1-hexyl, 2-ethyl-1-hexyl, 1-octyl or 1-dodecyl, $R^{102}$ is hydrogen or cyano, $R^{103}$, $R^{104}$ and $R^{106}$, independently of one another, are hydrogen, methoxy, ethoxy, propoxy, butoxy, hexyloxy or octyloxy, $R^{105}$ is methoxy, ethoxy, propoxy, butoxy, hexyloxy, octyloxy or hydroxyl, $R^{107}$ and $R^{108}$ are hydrogen, or $R^{107}$, together with $R^{108}$, is —CH$_2$—C(CH$_3$)$_2$—, and n and m, independently of one another, are 1 or 2.

Very particular preference is given to UV absorbers of the formula (CC) in which $R^{101}$ is ethyl or 2-ethyl-1-hexyl, $R^{102}$ is hydrogen, and $R^{103}$ is methoxy or ethoxy in the m- and/or p-position, $R^{107}$ and $R^{108}$ are hydrogen, or $R^{107}$, together with $R^{108}$, is —CH$_2$—C(CH$_3$)$_2$—, and n and m, independently of one another, are 1 or 2, or a UV absorber of the formula (CCI)

in which $R^{101}$ is ethyl or 2-ethyl-1-hexyl, $R^{102}$ is cyano, $R^{103}$ and $R^{104}$ are hydrogen, and n and m are 1, or a UV absorber of the formula (CCII)

in which $R^{105}$ is methoxy, ethoxy, octyloxy or hydroxyl, and $R^{106}$ is hydrogen, or a mixture of the UV absorbers of the formulae (CC) and (CCI) or a mixture of the UV absorbers (CC) and (CCI) or a mixture of the UV absorbers (CCI) and (CCII) or a mixture of the UV absorbers (CC) and (CCI) and (CCII)

in which the radicals are as defined above.

Very especial preference is given to a UV absorber of the formula

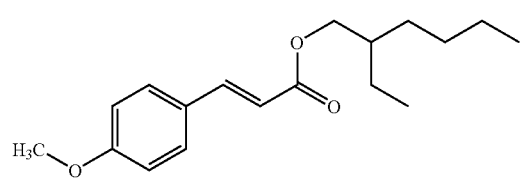

(CCIII)

or a UV absorber of the formula

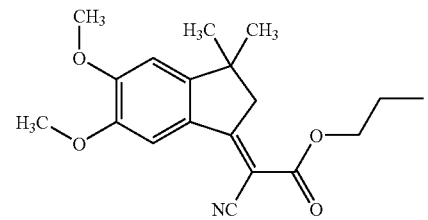

(CCIV)

a UV absorber of the formula

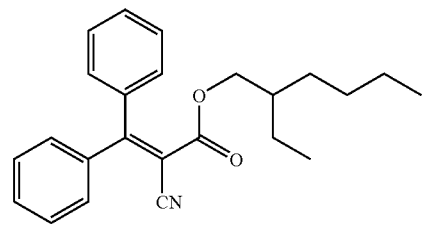

(CCV)

or a UV absorber of the formula

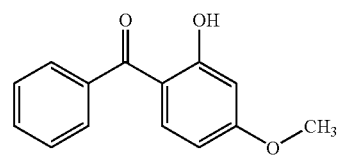

(CCVI)

or a mixture of the UV absorbers of the formulae (CCIII) and (CCV) or a mixture of the UV absorbers of the formulae (CCV) and (CCVI) or a mixture of the UV absorbers of the formulae (CCIII) and (CCVI) or a mixture of the formulae (CCIV) and (CCV) or a mixture of the formulae (CCIV) and (CCVI).

Suitable further UV absorbers for strengthening the UV protection from case to case are, for example, the following UV absorbers: examples are UV 3000 (2,4-dihydroxybenzophenone, BASF), Tinuvin® 571 (2-(2H-benzotriazol-2-yl)-6-dodecyl-4-methylphenol, Ciba), Cyasorb 24™ (2,2'-dihydroxy-4-methoxybenzo-phenone, American Cyanamid Company).

The nanoparticles and UV absorbers are present in a coating which is generally applied to both plates or films of the electrochromic device, but at least to the plate or film facing the light.

These coatings are generally applied to the outside of the electrochromic device, i.e. to the side of the plates or films which is not conductively coated.

Suitable coating materials are all transparent materials which adhere well to the plates or films, such as plastics or paints, for example polyurethanes, polyvinyl alcohol, polyvinyl acetate, polyacrylates, polymethacrylates, polyesters, polyamide, polyacrylonitrile, or corresponding copolymers, etc. However, these coating materials may also be films applied to the plates or films by means of adhesives. The coating materials have a thickness of from 0.1 to 500 µm. The UV absorbers of the formulae (CC) to (CCVI) are employed in the coating materials in the concentration range up to 30% by weight, preferably from 0.01 to 25% by weight.

The nanoparticles are employed in disperse form in the coating materials. They are employed in the concentration range from 0.001 to 30 atom-%, preferably from 0.01 to 10 atom-%.

The nanoparticles can be incorporated into such materials by customary methods, for example in accordance with WO-A 95/09895, WO-A 92/21315 and EP-A 0 628 303.

However, the coating materials may additionally contain other light-protection materials, such as quenchers or free-radical scavengers, as are usual in the plastics sector, for example UVINUL® 4049H (BASF), UVINUL® 4050H (BASF).

Preference is given to UV-protected electrochromic devices as claimed in the invention in which a) the reducible substance has at least one, preferably at least two, chemically reversible reduction waves in the cyclic voltammogram and the oxidizable substance correspondingly has at least one, preferably at least two, chemically reversible oxidation waves, or b) the reducible substance and the oxidizable substance are covalently bonded to one another via a bridge B, or c) the reducible and/or oxidizable substances selected are those in which the reversible transition between the oxidizable form and the reducible form or vice versa is associated with the breaking or forming of a σ-bond, or d) the reducible substance and/or the oxidizable substances are metal salts or metal complexes of metals which exist in at least two oxidation states, or e) the reducible and/or oxidizable substances are oligomers and polymers containing at least one of said redox systems, but also pairs of such redox systems as defined under a) to d), or f) the reducible and/or oxidizable substances employed are mixtures of the substances described in a) to e), provided these mixtures contain at least one reducible and at least one oxidizable redox system.

Through selection of the electrochromic compounds $RED_1$ and $OX_2$ and/or mixtures thereof, any desired monochromic hues can be established. For a polychromic color display, two or more such electrochromic devices can be placed one on top of the other, with each of these devices being capable of producing a different hue. Such a stack is preferably built up in such a way that the devices in contact with one another have a common light-transparent plate, which is then provided with a conductive coating on both sides and, depending on the design, divided into segments. A stack then consists, for example, of three electrochromic devices consisting of at least four plates. By switching on segments in various of these stacked devices, multicolored displays can be achieved. If consecutive segments in different devices of this kind are switched on, mixed colors are obtained. Thus, any desired colors can be displayed in the context of trichromicity, i.e., for example, colored images.

Suitable $OX_2$ and $RED_1$ for the purposes of the invention are substances which, on reduction or oxidation at the cathode or anode in the solvent mentioned, give products $RED_2$ and $OX_1$ which do not undergo any subsequent chemical reaction, but instead can be fully oxidized or reduced back to $OX_2$ and $RED_1$.

The electrochromic compounds $RED_1$ or $OX_2$ in their corresponding switched, colored state $OX_1$ or $RED_2$ respectively, besides the actual strong absorption in the visible part of the light spectrum which is important for the function of the electrochromic device, preferably have a further strong absorption in the range from 350 to 450 nm, i.e. in the transition region from ultraviolet to violet and blue light.

Suitable reducible substances $OX_2$ are, for example:

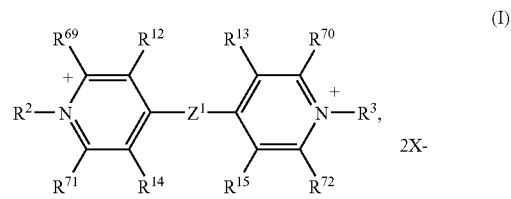

(I)

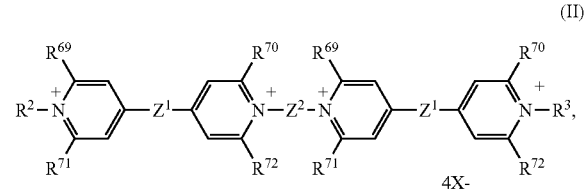

(II)

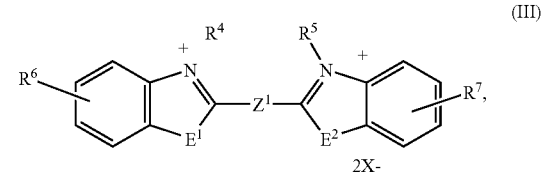

(III)

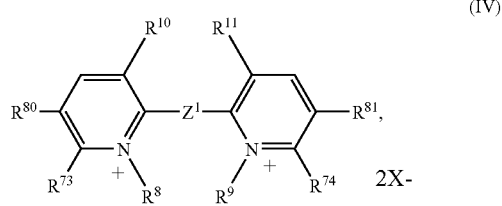

(IV)

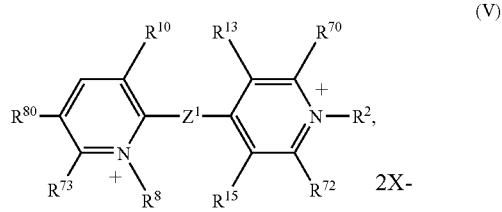

(V)

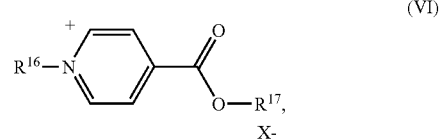

(VI)

-continued

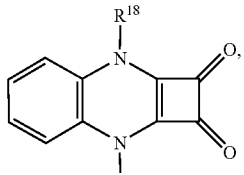
(VII)

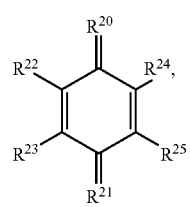
(VIII)

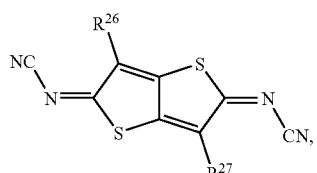
(IX)

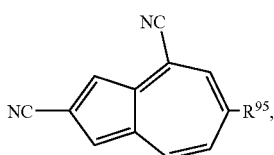
(X)

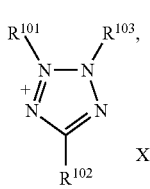
(CI)

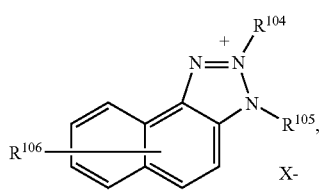
(CII)

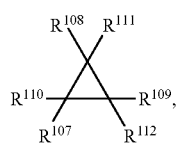
(CIII)

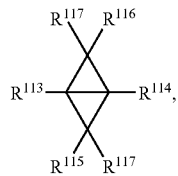
(CIV)

in which
$R^2$ to $R^5$, $R^8$, $R^9$, $R^{16}$ to $R^{19}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, or $R^4$; $R^5$ or $R^8$; $R^9$ together can form a —$(CH_2)_2$— or —$(CH_2)_3$— bridge, $R^6$, $R^7$ and $R^{22}$ to $R^{25}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or $R^{22}$; $R^{23}$ and/or $R^{24}$; $R^{25}$ can form a —CH=CH—CH=CH— bridge, $R^{10}$; $R^{11}$, $R^{10}$; $R^{13}$, $R^{12}$; $R^{13}$ and $R^{14}$; $R^{15}$, independently of one another, are hydrogen or in pairs are a —$(CH_2)_2$—, —$(CH_2)_3$— or —CH=CH— bridge, $R^{20}$ and $R^{21}$, independently of one another, are O, N—CN, $C(CN)_2$ or N—$C_6$- to $C_{10}$-aryl, $R^{26}$ and $R^{27}$ are hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl, $R^{69}$ to $R^{74}$, $R^{80}$ and $R^{81}$, independently of one another, are hydrogen or $C_1$- to $C_6$-alkyl, or $R^{69}$; $R^{12}$, $R^{70}$; $R^{13}$, $R^{73}$; $R^{80}$ and/or $R^{74}$; $R^{81}$ together form a —CH=CH—CH=CH-bridge, $E^1$ and $E^2$, independently of one another, are O, S, $NR^1$ or $C(CH_3)_2$, or $E^1$ and $E^2$ together form an —N—$(CH_2)_2$—N— bridge, $R^1$ is $C_1$- to $C_{18}$-alkyl, $C_2$- to $C_{12}$-alkenyl, $C_4$- to $C_7$-cycloalkyl, $C_7$- to $C_{15}$-aralkyl, $C_6$- to $C_{10}$-aryl, $Z^1$ is a direct bond, —CH=CH—, —C($CH_3$)=CH—, —C(CN)=CH—, —CCl=CCl—, —C(OH)=CH—, —CCl=CH—, —C≡C—, —CH=N—N=CH—, —C($CH_3$)=N—N=C($CH_3$)—, or —CCl=N—N=CCl—, $Z^2$ is —$(CH_2)_r$— or —$CH_2$—$C_6H_4$—$CH_2$—, r is an integer from 1 to 10, $R^{94}$ and $R^{95}$, independently of one another, are hydrogen or cyano, $R^{101}$ to $R^{105}$, independently of one another, are $C_6$- to $C_{10}$-aryl or an optionally benzo-fused aromatic or quasi-aromatic, five- or six-membered heterocyclic ring, $R^{107}$, $R^{109}$, $R^{113}$ and $R^{114}$, independently of one another, are a radical of the formulae (CV) to (CVII)

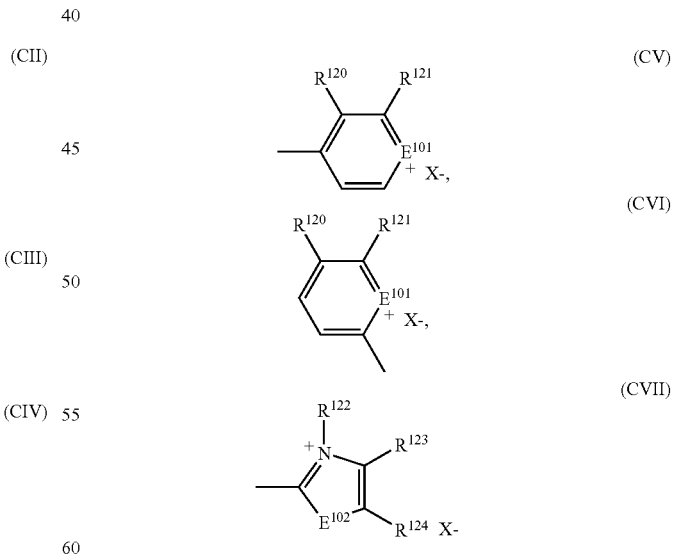

$R^{108}$, $R^{115}$ and $R^{116}$ independently of one another, are $C_6$- to $C_{10}$-aryl radical of the formula (CV), $R^{110}$ to $R^{112}$, $R^{117}$ and $R^{118}$, independently of one another, are hydrogen, $C_1$- to $C_4$-alkyl, halogen or cyano, $E^{101}$ and $E^{102}$, independently of one another, are O, S or N—$R^{119}$, $R^{119}$ and $R^{122}$, independently of one another, are $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, $R^{120}$, $R^{121}$, $R^{123}$, and $R^{124}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or $R^{120}$, $R^{121}$ or $R^{123}$, $R^{124}$ together form a —CH=CH—CH=CH— bridge, and $X^-$ is an anion which is redox-inert under the conditions.

Examples of suitable oxidizable substances RED, are the following:

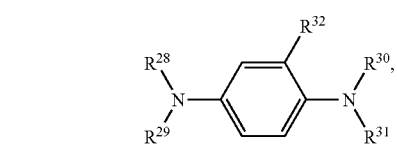
(XX)

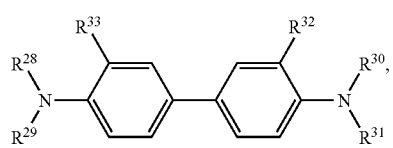
(XXI)

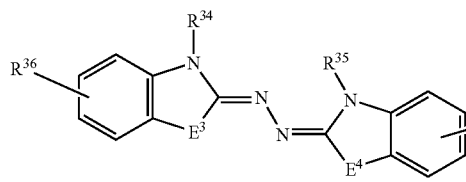
(XXII)

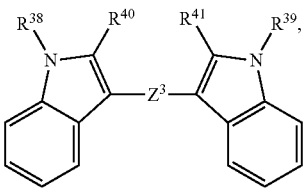
(XXIII)

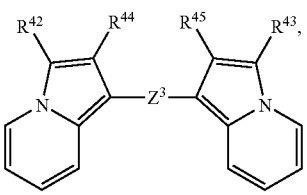
(XXIV)

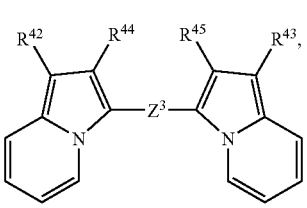
(XXV)

-continued

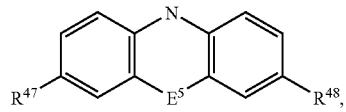
(XXVI)

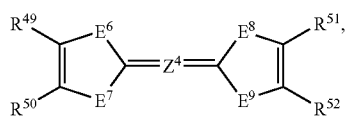
(XXVII)

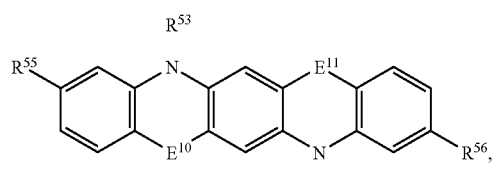
(XXVIII)

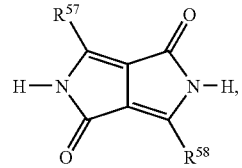
(XXIX)

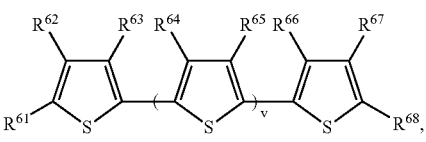
(XXX)

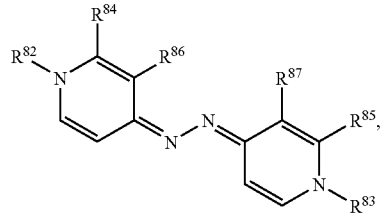
(XXXI)

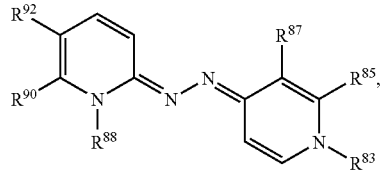
(XXXII)

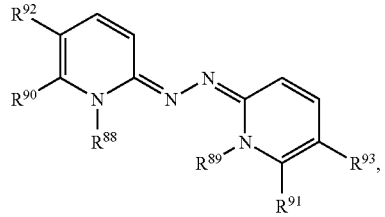
(XXXIII)

in which $R^{28}$ to $R^{31}$, $R^{34}$, $R^{35}$, $R^{38}$, $R^{39}$, $R^{46}$, $R^{53}$ and $R^{54}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{58}$, independently of one another, are hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl, and $R^{57}$ and $R^{58}$ are additionally an aromatic or quasi-aromatic, five- or six-membered heterocyclic ring which is optionally benzo-fused, and $R^{48}$ is additionally $NR^{75}R^{76}$, or $R^{49}$; $R^{50}$ and/or $R^5$; $R^{12}$ form a $-(CH_2)_3-$, $-(CH_2)_4-$, $-(CH_2)_5-$ or $-CH=CH-CH=CH-$ bridge, $Z^3$ is a direct bond, a $-CH=CH-$ or $-N=N-$ bridge, $=Z^4=$ is a direct double bond, a $=CH-CH=$ or $=N-N=$ bridge, $E^3$ to $E^5$, $E^{10}$ and $E^{11}$, independently of one another, are O, S, $NR^{59}$ or $C(CH_3)_2$, and E is additionally $C=O$ or $SO_2$, $E^3$ and $E^4$, independently of one another, can additionally be $-CH=CH-$, $E^6$ to $E^9$, independently of one another, are S, Se or $NR^{59}$, $R^{59}$, $R^{75}$ and $R^{76}$, independently of one another, are $C_1$- to $C_{12}$-alkyl, $C_2$- to $C_8$-alkenyl, $C_4$- to $C_7$-cycloalkyl, $C_7$- to $C_{15}$-aralkyl, $C_6$- to $C_{10}$-aryl, and $R^{75}$ is additionally hydrogen or $R^{75}$ and $R^{76}$ in the definition of $NR^{75}R^{76}$ are, together with the N atom to which they are bonded, a five- or six-membered ring, which optionally contains further heteroatoms, $R^{61}$; to $R^{68}$, independently of one another, are hydrogen, $C_1$- to $C_6$-alkyl, $C_1$- to $C_4$-alkoxy, cyano, $C_1$- to $C_4$-alkoxycarbonyl or $C_6$- to $C_{10}$-aryl, and $R^{61}$; $R^{62}$ and $R^{67}$; $R^{68}$, independently of one another, additionally form a $-(CH_2)_3-$, $-(CH_2)_4-$ or $-CH=CH-CH=CH-$ bridge, or $R^{62}$; $R^{61}$, $R^{64}$; $R^{65}$ and $R^{66}$; $R^{67}$ form an $-O-CH_2CH_2-O-$ or $-O-CH_2CH_2CH_2-O$-bridge, v is an integer between 0 and 100, $R^{82}$, $R^{83}$, $R^{88}$ and $R^{89}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{84}$ to $R^{87}$ and $R^{90}$ to $R^{93}$, independently of one another, are hydrogen or $C_1$- to $C_6$-alkyl, or $R^{84}$; $R^{86}$, $R^{85}$; $R^{87}$, $R^{90}$; $R^{92}$ and/or $R^{91}$; $R^{93}$ together form a $-CH=CH-CH=CH$-bridge.

Suitable as $RED_1$ are likewise anions, such as, for example, $I^-$, $I_3^-$, $Br^-$ and $SCN^-$.

Examples of optionally oligomeric or polymeric redox systems linked via a bridge B are those of the formula

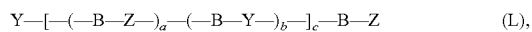   (L), in which

Y and Z, independently of one another, are a radical $OX_2$ or $RED_1$, where preferably at least one Y is $OX_2$ and at least one Z is $RED_1$, where $OX_2$ is the radical of a reversibly electrochemically reducible redox system, and $RED_1$ is the radical of a reversibly electrochemically oxidizable redox system, B is a bridging unit, c is an integer from 0 to 1000, and a and b, independently of one another, are an integer from 0 to 100.

$(a+b)\cdot c$ is preferably $\leq 10,000$.

The term reversibly electrochemically reducible or oxidizable here is taken to mean that electron transfer can take place with or without a change in the r-structure entirely within the sense of the abovementioned definition of $OX_2$ and $RED_1$ as claimed in the invention.

The electrochromic compounds of the formula (L) are in particular taken to mean those of the formulae

   (La),

   (Lb),

   (Lc),

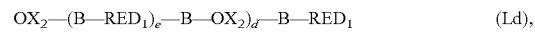   (Ld),

   (Le) or

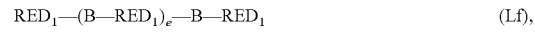   (Lf), in which $OX_2$, $RED_1$ and B are as defined above, d is an integer from 1 to 5, and e is an integer from 0 to 5.

$OX_2$ and $RED_1$ in the formulae (L) and (La) to (Lf) are taken to mean, in particular, radicals of the above-described redox systems of the formulae (I) to (X), (CI) to (CIV) and (XX) to (XXXIII) in which the bonding to the bridging unit B takes place via one of the radicals $R^2$ to $R^{19}$, to $R^{27}$, $R^{28}$ to $R^{58}$, $R^{61}$, $R^{62}$, $R^{67}$, $R^{68}$, $R^{83}$, $R^{88}R^{122}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, takes place via $R^1$, $R^{59}$ or $R^{119}$, and said radicals are then a direct bond, and B is a bridge of the formula $-(CH_2)_n-$ or $-Y^1{}_5-[(CH_2)_m-Y^2]_o-(CH_2)_p-Y^3{}_q-$, which may be substituted by $C_1$- to $C_4$-alkyl, $C_1$- to $C_4$-alkoxy, halogen or phenyl, $Y^1$ to $Y^3$, independently of one another, are O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n is an integer from 1 to 12, m and p, independently of one another, are integers from 0 to 8, o is an integer from 0 to 6, and q and s, independently of one another, are 0 or 1.

$OX_2$ and $RED_1$ in the formulae (L) and (La) to (Lf) are very particularly taken to mean radicals of the above-described redox systems of the formulae (I), (V), (XX), (XXII), (XXIII), (XXV), (XXVI) and (XXXIII).

Examples are of the formula (La)
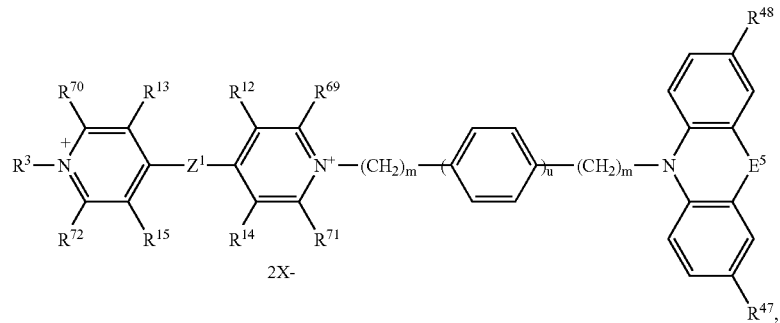
(LI)
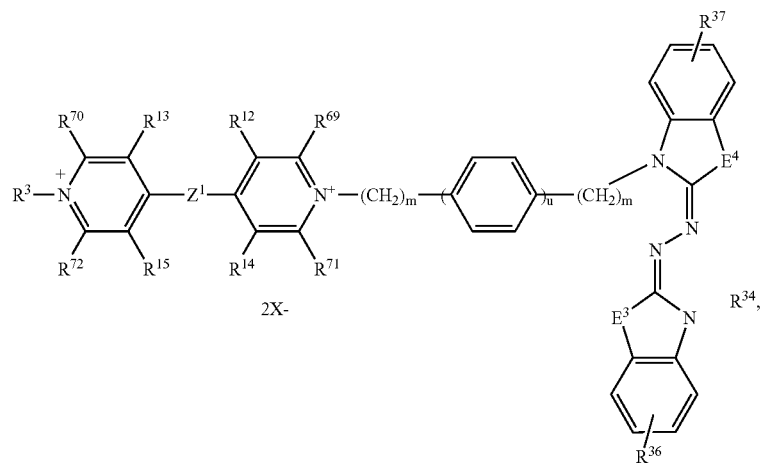
(LII)
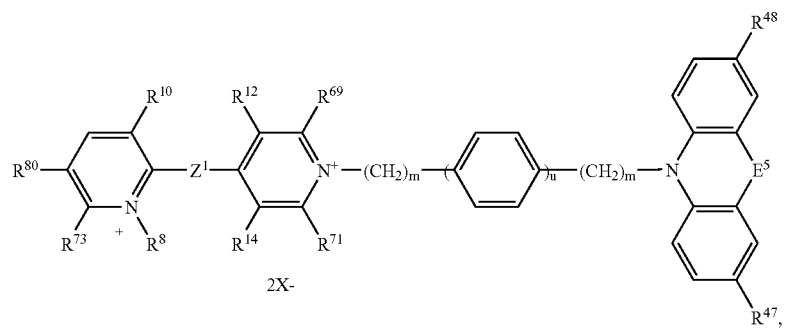
(LIII)
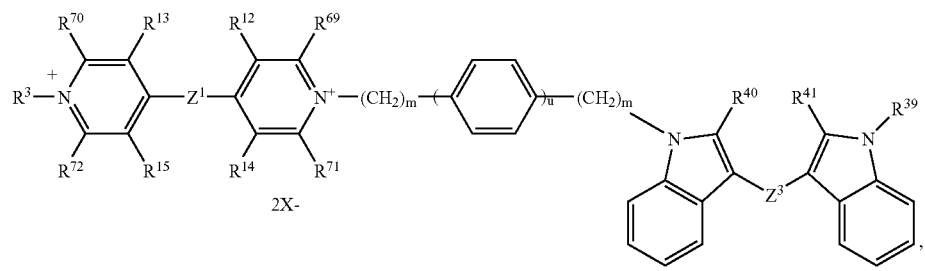
(LIV)

of the formula (Lb)
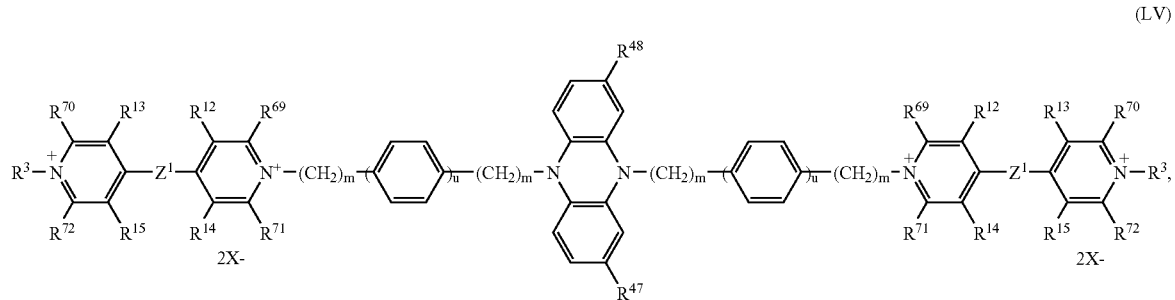
(LV)
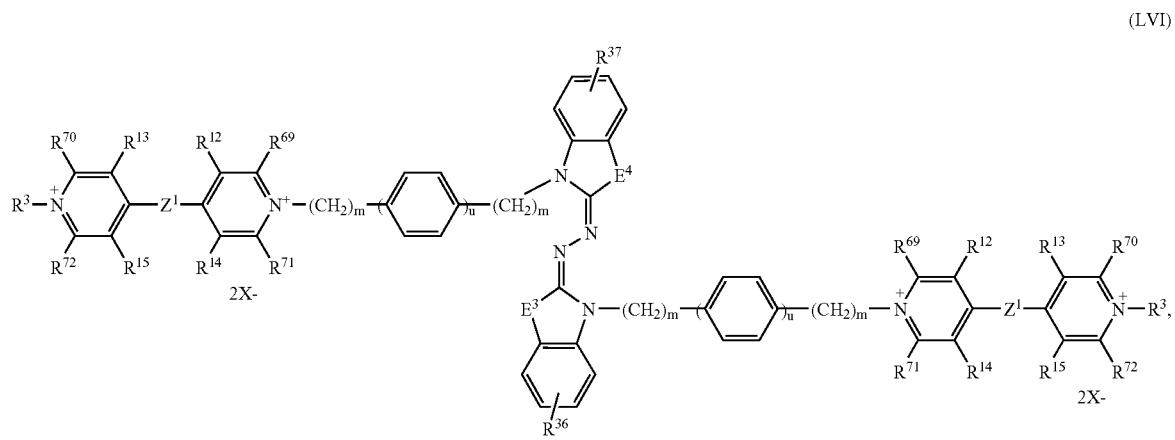
(LVI)
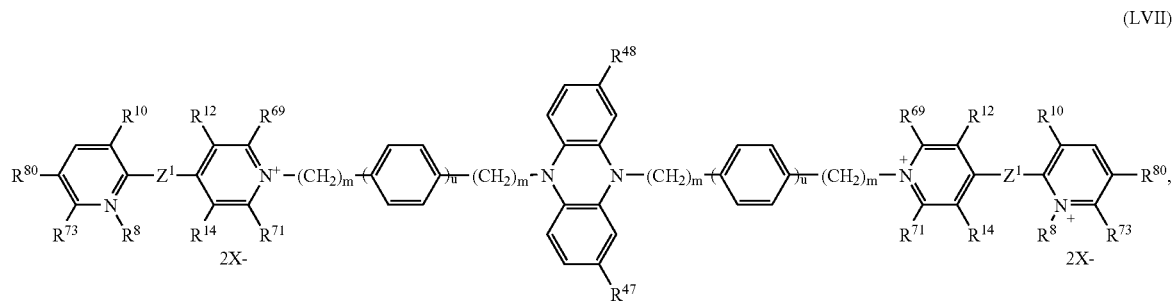
(LVII)

of the formula (Lc)
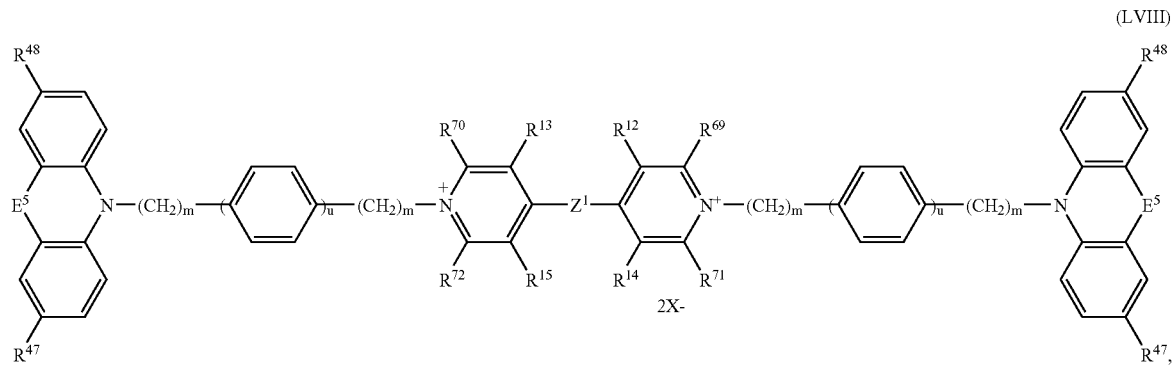
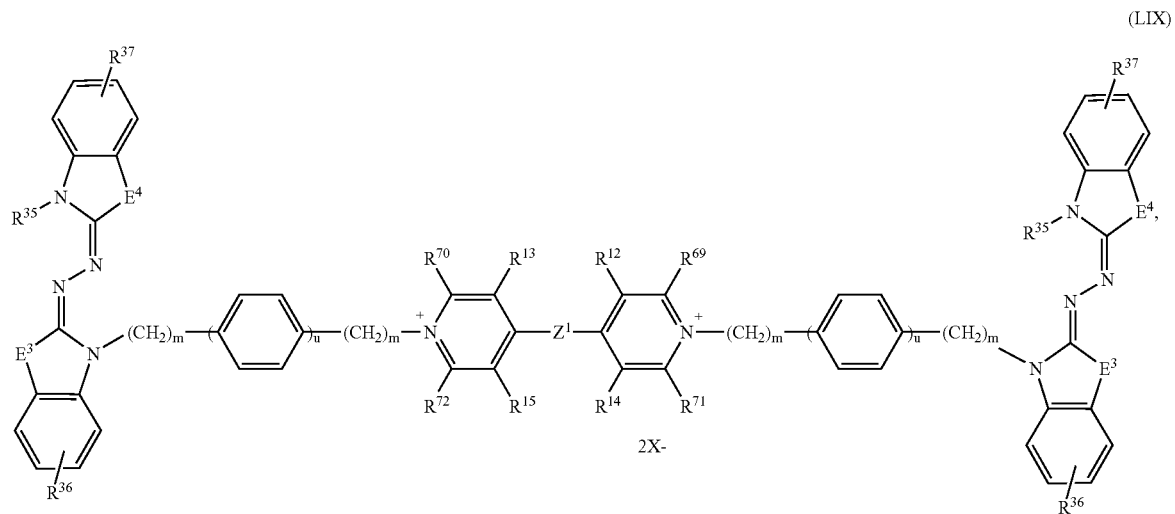
of the formula (Le)
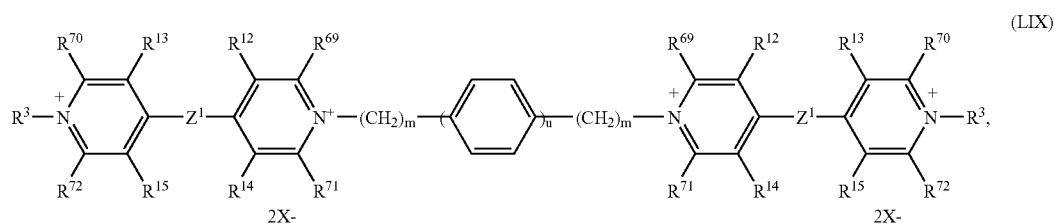

of the formula (Lf)

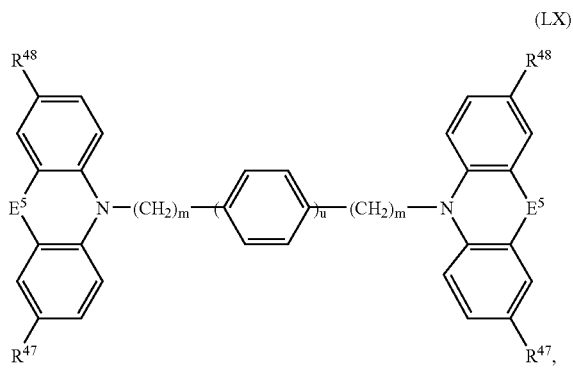

in which
m is an integer from 1 to 5,
n is 0 or 1, and
the other radicals are as defined above.

In another type of oligomeric or polymeric system, the $OX_2$ and/or $RED_1$ groups may also be bonded, for example as side chains, to a main group, for example a poly(meth)acrylate, silicone, polycarbonate, polyurethane, polyurea, polyester, polyamide, cellulose or other oligomeric or polymeric system.

Examples of metal salts or metal complexes which can be employed as $OX_2$ or $RED_1$ are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3^{0/4-}$, $[Co(CN)_6]^{3-/4-}$, $[Fe(cyclopentadienyl)_2]^{0/+}$, $Luc^{2+to\ 2-}$ (Pc=phthalocyanine), $Fe[Fe(CN)_6]^{0/1-}$.

Suitable counterions for metal ions and cationic complexes are all redox-inert anions $X^-$, as described more precisely later, and suitable counterions of the anionic complexes are all redox-inert cations $M'^+$, for example alkali metals or quaternary ammonium salts, such as $Na^+$, $K^+$, $N(CH_3)_4^+$, $N(C_4H_9)_4^+$, $C_6H_5CH_2N(CH_3)_3^+$ and others.

Preference is likewise given to an electrochromic device containing mixtures of the electrochromic substances mentioned above in general and preferred terms. Examples of such mixtures are (I)+(CI)+(XXVI), (I)+(IV)+(XXII), (La)+(I)+(XXVI), (La)+(CI), (LIX)+(LXL), without this being intended to express any restriction.

The mixing ratios are variable within broad limits. They allow a desired hue or degree of blackening to be optimized and/or the desired dynamics of the device to be optimized.

In the substituent definitions given above, alkyl radicals, including derivatives, are, for example, alkoxy or aralkyl radicals, preferably those having 1 to 12 C atoms, in particular having 1 to 8 C atoms, unless stated otherwise. They can be straight-chain or branched and can optionally carry further substituents, such as $C_1$- to $C_4$-alkoxy, fluorine, chlorine, hydroxyl, cyano, $C_1$- to $C_4$-alkoxycarbonyl or COOH.

The term "cycloalkyl radicals" is preferably taken to mean those having 3 to 7 carbon atoms, in particular having 5 or 6 carbon atoms.

Alkenyl radicals are preferably those having from 2 to 8 carbon atoms, in particular 2 to 4 carbon atoms.

Aryl radicals, including those in aralkyl radicals, are phenyl or naphthyl radicals, in particular phenyl radicals. They can be substituted by 1 to 3 of the following radicals: $C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals can also form a ring.

The term "optionally benzo-fused aromatic or quasi-aromatic, five- or six-membered heterocyclic rings" is taken to mean, in particular, imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by 1 to 3 of the following radicals: $C_1$- to $C_6$-alkyl, $C_1$- to $C_6$-alkoxy, fluorine, chlorine, bromine, cyano, nitro, hydroxyl, mono- or di-$C_1$- to $C_6$-alkylamino, $C_1$- to $C_6$-alkoxycarbonyl, $C_1$- to $C_6$-alkylsulphonyl, $C_1$- to $C_6$-alkanoylamino, phenyl or naphthyl. Two adjacent radicals may also form a ring.

The electrochromic substances are either known (Topics in Current Chemistry, Vol. 92, pp. 1–44, (1980), Angew. Chem. 90, 927 (1978), Adv. Mater. 3, 225, (1991), DE-A 3.917.323, J. Am. Chem. Soc. 117, 8528 (1995), J. C. S. Perkin II 1990, 1777, DE-A 4.435.211, EP-A 476.456, EP-A 476.457, DE-A 4.007.058, J. Org. Chem. 57, 1849 (1992) and J. Am. Chem. Soc. 99, 6120, 6122 (1977), or can be prepared analogously. The compounds of the formula (L) are likewise known (WO 97/30134) or can be synthesized from components known per se, for example in accordance with the following scheme:

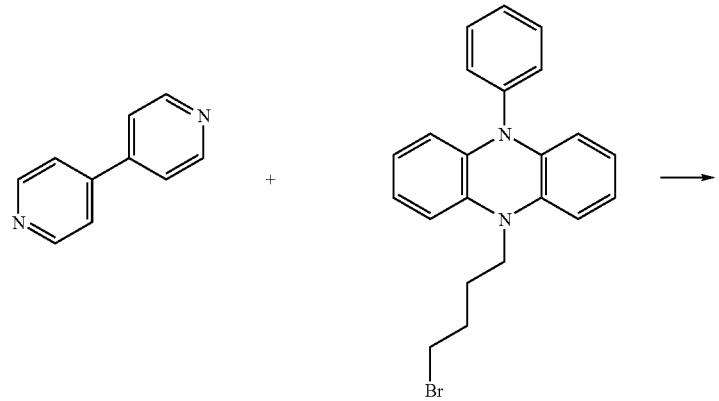

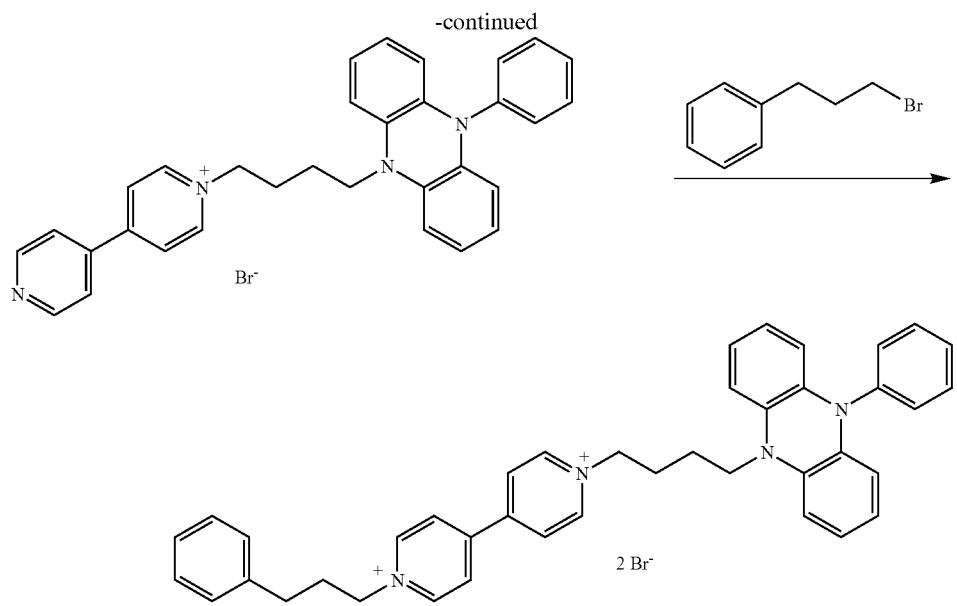

Synthetically required ions, such as bromide, are subsequently replaced by redox-inert ions.

Particular preference is given to the electrochromic compounds of the formulae (I), (II), (III), (IV), (V), (XXII), (XXIII), (XXVI), (XXVII), (XXXI), (XXXII), (XXXIII), and the bridged compounds of the formula (L) containing at least one of these formulae as $OX_2$ or $RED_1$.

In this selection and likewise in the following particular and exceptional selections of electrochromic compounds, it must always be ensured that the electrochromic medium contains at least one $OX_2$ and at least one $RED_1$. If, for example, $OX_2$=formula (I), the electrochromic medium must also contain an $RED_1$, preferably from the selection of the preferred $RED_1$ of the formulae (XXII), (XXIII), (XXVI), (XXVII), (XXXI), (XXXII), and (XXXIII), but also from the selection given in general terms above of $RED_1$ of the formulae (XX) to (XXIIII), and of the abovementioned metal salts, complexes or anions $X^-$ suitable as $RED_1$. This also applies analogously to the preferred and particularly preferred $RED_1$.

Very particular preference is given to the electrochromic compounds of the formulae (IV), (V), (XXII), (XXIII), (XXVII) and (XXXIII)

in which $R^2$, $R^3$, $R^8$ and $R^9$, independently of one another, are methyl, ethyl, propyl, butyl, pentyl, hexyl, heptyl, benzyl, phenethyl, phenylpropyl, phenyl, 2-methylphenyl or 2,6-dimethylphenyl or $R^8$ and $R^9$ together form a —$(CH_2)_2$— or —$(CH_2)_3$— bridge, $R^{10}$ to $R^{15}$ are hydrogen, $R^{69}$ to $R^{73}$, $R^{80}$ and $R^{81}$, independently of one another, are hydrogen or methyl, or $R^{12}$; $R^{69}$, $R^{13}$; $R^{70}$, $R^{73}$; $R^{80}$ and/or $R^{74}$; $R^{81}$ form a —CH=CH—CH=CH— bridge, $Z^1$ is a direct bond or —CH=CH—, $X^-$ is an anion which is redox-inert under the conditions, $R^{34}$, $R^{35}$, $R^{38}$, $R^{39}$, $R^{88}$ and $R^{89}$, independently of one another, are methyl, ethyl, propyl, butyl, benzyl, phenethyl, phenylpropyl or phenyl, $R^{36}$ and $R^{37}$ are hydrogen, $Z^3$ is a direct bond or a —CH=CH— bridge, $Z^1$ is a direct double bond, $R^{40}$ and $R^{41}$ are identical and are hydrogen or methyl, $E^3$ and $E^4$ are identical and are S, N—$R^{59}$ or $C(CH_3)_2$, $E^6$ to $E^9$ are identical and are S, $R^{49}$ to $R^{52}$, independently of one another, are hydrogen, methyl, cyano or methoxycarbonyl, or $R^{49}$; $R^{50}$ and/or $R^{51}$; $R^{52}$ form a —$(CH_2)_3$— or —CH=CH—CH=CH— bridge, $R^{49}$ to $R^{93}$ are hydrogen, or $R^{90}$; $R^{92}$ and/or $R^{91}$; $R^{93}$ form a —CH=CH—CH=CH— bridge, and $R^{59}$ is methyl, ethyl, propyl or butyl, and the bridged compounds of the formula (L), in particular of the formula (La), containing at least one of these formulae as $OX_2$ or $RED_1$, where B is —$(CH_2)_n$—, and n is an integer from 3 to 6.

Very outstandingly suitable for the purposes of the invention are the electrochromic compounds of the formula (1)

in which $R^2$ and $R^3$ are identical and are methyl, ethyl, butyl, heptyl or phenylpropyl, $R^{12}$ to $R^{15}$ and $R^{69}$ to $R^{72}$ are hydrogen, $Z^1$ is a direct bond, and $X^-$ is a redox-inert anion or $I^-$.

Likewise very outstandingly suitable for the purposes of the invention are the electrochromic compounds of the formula (La)

in which $OX_2$ is a radical of the formula (I), $RED_1$ is a radical of the formula (XXVI), and B is —$(CH_2)_n$—, where n is an integer from 3 to 6, $R^2$ and $R^{46}$ are a direct bond to B, $R^3$, $R^{12}$ to $R^{15}$, $R^{69}$ to $R^{72}$, $Z^1$ and $X^-$ have the outstanding meaning given above, $R^{47}$ and $R^{48}$ are hydrogen, $E^5$ is $NR^{59}$, and $R^{59}$ is methyl, ethyl, butyl, heptyl, phenylpropyl or phenyl.

The UV-protected electrochromic device as claimed in the invention preferably comprises in its electrochromic medium at least one solvent in which the electrochromic substances, if used a conductive salt and if used further additives are dissolved. The solvent can also have been thickened in the form of a gel, for example by polyelectrolytes, porous solids or nanoparticles having large active surface areas.

Suitable solvents are all solvents which are redox-inert under the selected voltages and which cannot eliminate electrophiles or nucleophiles or themselves react as sufficiently strong electrophiles or nucleophiles and thus could react with the colored free-radical ions. Examples are propylene carbonate, γ-butyrolactone, acetonitrile, propionitrile, benzonitrile, glutaronitrile, methylglutaronitrile, 3,3'-oxy-dipropionitrile, hydroxypropionitrile, dimethylformamide, N-methylpyrrolidone, sulpholane, 3-methylsulpholane or mixtures thereof. Preference is given to propylene carbonate, benzonitrile and mixtures with one another or with glutaronitrile or 3-methylsulpholane. Particular preference is given to propylene carbonate. Particular preference is likewise given to benzonitrile.

The electrochromic solution may contain at least one inert conductive salt. In particular if at least one of the substances of the redox pair $RED_1/OX_2$ is of an ionic nature, the addition of a conductive salt can be omitted.

Suitable inert conductive salts are lithium, sodium and tetraalkylammonium salts, in particular the latter. The alkyl groups can contain between 1 and 18 carbon atoms and can be identical or different. Preference is given to tetrabutylammonium. Suitable anions for these salts, in particular as anions $X^-$ in the formulae (I) to (VI), (CI), (CII) and (CV) to (CVII) and in the metal salts are all redox-inert, colorless anions.

Examples are tetrafluoroborate, tetraphenylborate, cyanotriphenylborate, tetra-methoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanidoundecaborate(−1) or (−2), which are optionally substituted on the B and/or C atoms by one or two methyl, ethyl, butyl or phenyl groups, dodecahydrodicarbadodecaborate(−2) or B-methyl-C-phenyldodecahydrodicarbadodecaborate(−1).

Likewise suitable, including as anions $X^-$ in the formulae (I) to (VI), (CI), (CII) and (CV) to (CVII) and in the metal salts, are the abovementioned anions which can also take on the role of an $RED_1$, for example $I^-$ and $I_3^-$.

The conductive salts are preferably employed in the range from 0 to 1 mol/l.

As further additives, thickeners can be added for controlling the viscosity of the electroactive system. This can be important in order to avoid segregation, i.e. the formation of colored streaks or spots on extended operation of the electrochromic device in the switched-on state and for controlling the fading rate after the current has been switched off.

Suitable thickeners are all the usual compounds for this purpose, for example polyacrylate, polymethacrylate (Lucatite L®), polycarbonate and polyurethane.

Suitable further additives for the electrochromic solution for strengthening the protection against UV light (<350 nm) are UV absorbers. Examples are UVINUL® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxybenzo-phenone, American Cyanamid Company), UVINUL® 3035 (ethyl 2-cyano-3,3-di-phenylacrylate, BASF), UVINUL® 3039 (2-ethylhexyl 2-cyano-3,3-diphenylacrylate, BASF), UVINUL® 3088 (2-ethylhexyl p-methoxycinnamate, BASF), and CHIMASSORB® 90 (2-hydroxy-2-methoxybenzophenone, Ciba).

Preference is given to the latter four. Preference is likewise given to mixtures of UV absorbers, for example of the latter four. Particular preference is given to the mixture of UVINUL® 3039 and CHIMASSORB® 90. Likewise suitable are the above-described UV absorbers of the formulae (CC) to (CCVI).

The UV absorbers are employed in the range from 0.01 to 2 mol/l, preferably from 0.04 to 1 mol/l.

The electrochromic solution comprises the electrochromic substances $OX_2$ and $RED_1$, in particular those of the formulae (I) to (X), (XX) to (XXXII), (CI) to (CIV) and (L), in each case in a concentration of at least $10^{-4}$ mol/l, preferably from 0.001 to 0.5 mol/l. The total concentration of all electrochromic substances present is preferably less than 1 mol/l.

For operation of the electrochromic device as claimed in the invention, a constant, pulsed or varying-amplitude, for example sinusoidally varying, direct current is used. The voltage depends on the desired color depth, but in particular on the reduction and oxidation potentials of the $OX_2$ and $RED_1$ respectively used. Such potentials are given, for example, in Current Chemistry, Volume 92, pp. 1–44, (1980) or Angew. Chem. 90, 927 (1978), or the literature cited therein. The difference in their potentials is a guide value for the requisite voltage, but the electrochromic device can be operated at a lower or also higher voltage. In many cases, for example on use of $OX_2$=formula (I) or (V) and $RED_1$=formula (XX), (XXII), (XXVI) or (XXVII), or linking thereof via a bridge of the formula (L), in particular formulae (La) to (Ld), this potential difference necessary for operation is ≦1 V. Electrochromic devices of this type can therefore be supplied in a simple manner with the current from photovoltaic silicon cells.

If the voltage is switched off, the electrochromic device as claimed in the invention returns to its original state. This extinguishing can be considerably accelerated if the contacted segments or plates are short-circuited. Repeated reversal of the voltage, optionally also with simultaneous reduction in the voltage, also enables the display to be extinguished very rapidly.

The switch-on and switch-off times of the display device can be influenced in broad limits by variation of the layer thickness of the electrochromic device, the viscosity of the electrochromic solution and/or the diffusion capacity or driftability of the electrochromic substances. Thus, for example, thin layers exhibit shorter response times than thick ones. Fast- and slow-switchable devices can thus be constructed and matched optimally to the respective applications.

In the case of slow devices, in particular display devices, a current save or refresh mode can be used to maintain the displayed information in the switched-on state. After buildup of the information to be displayed, for example through a constant or high-frequency-changing or pulsed direct voltage of adequate magnitude, the system is switched to pulsed or changing direct voltage of low frequency, with the contacting of the segments not being short-circuited during the phases in which the voltage is zero. This low frequency can be, for example, in the region of 1 Hz or lower, it not being necessary for the duration of the switch-on and switch-off phases to be of equal length, but instead, for example, the switch-off phases can be significantly longer. Since the color depth of the displayed information only drops slowly during the current pauses in the non-short-circuited state, relatively short current pulses are sufficient to compensate for these losses again in the subsequent refresh phase. In this way, a flicker-free image with virtually constant color depth is obtained, but whose maintenance requires only a fraction of the current which would arise in the case of permanent current flow.

Special embodiments of the above-mentioned types 1 and 2 can be, for example, the following, which are likewise a subject matter of the invention if they are protected against UV light by a protective layer which comprises nanoparticles and UV absorbers:

Type 1: (Unmirrored)

from the light protection/light filter area: window panes for buildings, road vehicles, aircraft, railways, ships, roof glazing, automobile sunroofs, glazing of greenhouses and conservatories, light filters of any desired type;

from the security/confidentiality area: dividing screens for room dividers, for example in offices, road vehicles, aircraft, railways, sight protection screens, for example at bank counters, door glazing, visors for motorcycle or pilot helmets; from the design area: glazing of ovens, microwave equipment, other domestic appliances, furniture;

from the displays area: analogue voltage displays, as battery testers, tank displays, temperature displays, etc.

Type 1: (Mirrored)

mirrors of all types, for example for road vehicles, railways, in particular planar, spherical and aspherical mirrors and combinations thereof, for example spherical/aspherical mirror glazing in furniture.

Type 2:

display devices of all types, for example segment or matrix displays, for example for watches, computers, electrical equipment, electronic equipment, such as radios, amplifiers, TV sets, CD players, destination displays in buses and trains, departure displays in stations and airports, flat screens, all applications mentioned under types 1 and 2 which contain at least one switchable static or variable display device, such as dividing screens containing displays such as "Please do not disturb", "Counter closed", for example automobile mirrors containing displays of any desired type, such as display of the temperature, faults in the vehicle, for example oil temperature, open doors, time, compass direction.

The invention claimed is:

1. An electrochromic device consisting of a pair of glass or plastic plates or plastic films of which at least one plate or film are provided on in each case one side with an electrically conductive coating, of which at least one plate or film and its conductive coating is transparent, of which the other, optionally, is mirrored, and of which in the case of at least one of the two plates or films the electrically conductive layer is optionally, divided into separate, individually contacted area segments, where the plates or films are joined together via a sealing ring on the sides of their conductive coating, and the volume formed by the two plates or films and the sealing ring is filled with an electrochromic medium, wherein at least one of the two plates or films carries a coating which comprises nanoparticles and at least one UV absorber.

2. The electrochromic device as claimed in claim 1, wherein the at least one UV absorber of said coating comprises an organic UV absorber.

3. The electrochromic device as claimed in claim 1, wherein the coating comprises an organic UV absorber and inorganic nanoparticles.

4. The electrochromic device as claimed in claim 1, wherein the absorption edge of the nanoparticles is at a shorter wavelength than the long-wave absorption edge of the UV absorber.

5. The electrochromic device as claimed in claim 1, wherein it is a display device.

6. The electrochromic device as claimed claim 1, wherein it is a mirror.

7. The electrochromic device as claimed in claim 1, wherein it is a window.

8. The electrochromic device as claimed in claim 1, wherein the coating consists of an organic polymer.

9. The electrochromic device as claimed in claim 1, wherein the electrochromic medium comprises at least one pair of redox substances, one of which is reducible and the other is oxidizable, both being colorless or only weakly colored, and, after application of a voltage to the electrochromic device, the first substance is reduced and the other is oxidized, at least one becoming colored, and, after the voltage is switched off, the two original redox substances are reformed and the electrochromic device decolorizes.

10. The electrochromic device as claimed in claim 9, wherein a) the reducible substance has at least one chemically reversible reduction waves in the cyclic voltammogram and the oxidizable substance correspondingly has at least one chemically reversible oxidation waves, or b) the reducible substance and the oxidizable substance are covalently bonded to one another via a bridge B, or c) the reducible and/or oxidizable substances selected are those in which the reversible transition between the oxidizable form and the reducible form or vice versa is associated with the breaking or forming of a σ-bond, or d) the reducible substance and/or the oxidizable substance are metal salts or metal complexes of metals which exist in at least two oxidation states, or e) the reducible and/or oxidizable substances are oligomers and polymers containing at least one of said redox systems, but also pairs of such redox systems as defined under a) to d), or f) the reducible and/or oxidizable substances employed are mixtures of the substances described in a) to e), provided that these mixtures contain at least one reducible and at least one oxidizable redox system.

11. The electrochromic device as claimed in claim 1, wherein the organic UV absorber used is at least one of the formulae

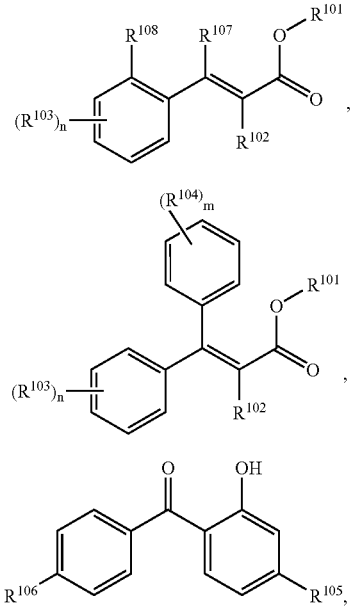

in which
R$^{101}$ is optionally substituted C$_1$- to C$_{20}$-alkyl,
R$^{102}$ is hydrogen, cyano or COOR$^1$,
R$^{103}$, R$^{104}$ and R$^{106}$, independently of one another, are hydrogen, C$_1$- to C$_{12}$-alkyl or C$_1$- to C$_{12}$-alkoxy,
R$^{105}$ is hydrogen, C$_1$- to C$_{12}$-alkyl, C$_1$- to C$_{12}$-alkoxy or hydroxyl,
R$^{107}$ is hydrogen or C$_1$- to C$_{12}$-alkyl,
R$^{108}$ is hydrogen, or
R$^{107}$, together with R$^{108}$, forms a C$_2$- or C$_3$-bridge, which may carry up to 3 C$_1$- to C$_4$-alkyl radicals, and
n and m, independently of one another, are an integer from 1 to 3.

12. The electrochromic device as claimed in claim 3, wherein the inorganic nanoparticles are those based on SiC, AlSi, Ag, Fe$_2$O$_3$, Fe$_3$O$_4$, TiO$_2$, ZnO, GaP, CeO$_2$, ZnS, SnO$_2$, Si$_y$Ge$_{1-y}$, W$_x$Mo$_{1-x}$O$_3$, NiO, Bi$_2$O$_3$, In$_2$O$_3$, HfO$_2$, BaTiO$_3$, CaTiO$_3$, Ge, AlP, GaN, in which $0.7 \leq y < 1$ and $0 \leq x \leq 1$.

13. An electrochromic device according to claim 1, wherein both plates or films are provided on in each case one side with an electrically conductive coating.

14. The electrochromic device as claimed in claim 9, wherein the reducible substance has at least two chemically reversible reduction waves in the cyclic voltammogram and the oxidizable substance correspondingly has at least two chemically reversible oxidation waves.

* * * * *